US012769672B2

(12) United States Patent
Mishra et al.

(10) Patent No.: US 12,769,672 B2
(45) Date of Patent: Oct. 20, 2026

(54) MEMORY ACCESS LOCKING AND LOGGING FOR TRUSTED EXECUTION ENVIRONMENTS

(71) Applicant: Analog Devices, Inc., Wilmington, MA (US)

(72) Inventors: Tanmaya Mishra, Wilmington, MA (US); Scott Peters, Brookston, IN (US)

(73) Assignee: Analog Devices, Inc., Wilmington, MA (US)

( * ) Notice: Subject to any disclaimer, the term of this patent is extended or adjusted under 35 U.S.C. 154(b) by 32 days.

(21) Appl. No.: 18/742,837

(22) Filed: Jun. 13, 2024

(65) Prior Publication Data

US 2025/0383997 A1 Dec. 18, 2025

(51) Int. Cl.
*G06F 12/14* (2006.01)

(52) U.S. Cl.
CPC .. *G06F 12/1466* (2013.01); *G06F 2212/1052* (2013.01)

(58) Field of Classification Search
None
See application file for complete search history.

(56) References Cited

U.S. PATENT DOCUMENTS

| | | | | |
|---|---|---|---|---|
| 7,383,587 | B2 * | 6/2008 | Watt | G06F 9/45558 713/193 |
| 10,545,885 | B2 | 1/2020 | Yonemura et al. | |
| 2009/0083520 | A1 * | 3/2009 | Kanemura | G06F 12/1458 712/E9.035 |
| 2009/0316889 | A1 * | 12/2009 | Macdonald | G06F 21/10 711/171 |
| 2016/0117506 | A1 | 4/2016 | Buer et al. | |
| 2021/0049085 | A1 | 2/2021 | Zhang et al. | |
| 2021/0117579 | A1 | 4/2021 | Dekens | |

(Continued)

OTHER PUBLICATIONS

"Arm TrustZone Technology for the Armv8-M Architecture, Version 2.1", Arm Limited, (2018), 26 pgs.

(Continued)

*Primary Examiner* — Charles J Choi
(74) *Attorney, Agent, or Firm* — Schwegman Lundberg & Woessner, P.A.

(57) ABSTRACT

This disclosure describes approaches for securing memory among non-secure/secure processing environments such as in a TrustZone-M processor architecture. An example method of controlling memory access includes: configuring a memory locking service in a computing device having a secure processing environment and a non-secure processing environment, and executing the memory locking service in the secure processing environment; receiving a request with the memory locking service to lock a specified memory region of the computing device, with the specified memory region being associated with the non-secure processing environment; associating the specified memory region with the secure processing environment (e.g., by using a Security Attribution Unit to upgrade the region to secure memory); subsequently, identifying an access attempt to the specified memory region, with the access attempt being received from (Continued)

the non-secure processing environment; and controlling the access attempt to the specified memory region, based on a policy.

20 Claims, 5 Drawing Sheets

(56) References Cited

U.S. PATENT DOCUMENTS

| | | | |
|---|---|---|---|
| 2022/0004506 | A1 | 1/2022 | Connolly et al. |
| 2025/0384122 | A1 | 12/2025 | Mishra et al. |

OTHER PUBLICATIONS

Mishra, Tanmaya, et al., "A Procrastinating Control-Flow Integrity Framework for Periodic Real-Time Systems", RTNS 2023, Jun. 7-8, 2023, Dortmund, Germany, ACM, (2023), 132-142.
Mishra, Tanmaya, et al., "TEECheck: Securing Intra-Vehicular Communication Using Trusted Execution", RTNS 2020, Jun. 9-10, 2020, Paris, France, ACM, (2020), 11 pgs.
Shim, Dongwook, et al., "SOTPM: Software One-Time Programmable Memory to Protect Shared Memory on ARM Trustzone", IEEE Access, vol. 9, (2021), 4490-4504.
Soubra, Diya, "Useful tips to develop secure software on ARMv8-M", Architectures and Processors blog—Arm Community blogs, [Online]. Retrieved from the Internet: <URL:https://community.arm.com/arm-community-blogs/b/architectures-and-processors-blog/posts/useful-tips-for-developing-secure-software-on-armv8-m> [Retrieved on Apr. 15, 2024], (Nov. 1, 2016), 11 pgs.
Soubra, Diya, "What is the software overhead for TrustZone forARMv8-M?", Arm Architectures and Processors forum, [Online]. Retrieved from the Internet: <URL: https://community.arm.com/support-forums/f/architectures-and-processors-forum/7982/what-is-the-software-overhead-for-trustzone-for-armv8-m> [Retrieved on Apr. 15, 2024], (2016), 2 pgs.
"U.S. Appl. No. 18/742,791, Non Final Office Action mailed Nov. 5, 2025", 9 pgs.
"U.S. Appl. No. 18/742,791, Notice of Allowance mailed Apr. 15, 2026", 9 pgs.
"U.S. Appl. No. 18/742,791, Response filed Feb. 5, 2026 to Non Final Office Action mailed Nov. 5, 2025", 12 pgs.

* cited by examiner

MEMORY ACCESS LOCKING AND LOGGING FOR TRUSTED EXECUTION ENVIRONMENTS

FIELD OF THE DISCLOSURE

This document pertains generally, but not by way of limitation, to memory access techniques used in connection with trusted execution environments and operating system environments such as a secure processing environment hosted for a real-time operating system (RTOS).

BACKGROUND

Trusted Execution Environments (TEEs) can be hosted within many types of computing processors and processor architectures. TEEs are generally designed to provide the following attributes: confidentiality, so that data in the TEE can only be accessed by authorized programs or code inside the environment; integrity, to prevent unauthorized entities from altering data or code of the TEE; and isolation from unsecure or untrusted entities, such as by using a secure, isolated area of memory for data and executing instructions in an area of the processor that is protected from other processes of the processor (e.g., protected with use of encryption).

TEEs are often enabled through specific hardware support functions, such as functions directly provided by a secure processor included within the processor circuitry. Some example types of TEEs that are implemented in current processor architectures include AMD® SEV (Secure Encrypted Virtualization), Intel® SGX (Software Guard Extensions), and ARM® TrustZone. Although the implementation specifics vary for these types of TEEs, each of these TEEs generally provide private regions of memory and execution to enable the foregoing aspects of confidentiality, integrity, and isolation.

SUMMARY OF THE DISCLOSURE

This disclosure describes various method, system, and software instruction implementations for controlling access to regions or areas of memory in a secure/non-secure processing environment configuration.

In some aspects, the techniques described herein relate to a method of controlling memory access in a non-secure processing environment, the method including: providing a memory locking service in a computing device, the computing device including a secure processing environment and a non-secure processing environment, with the memory locking service being executed in the secure processing environment; receiving a request with the memory locking service to lock a specified memory region of the computing device, with the specified memory region being associated with the non-secure processing environment; associating the specified memory region with the secure processing environment; identifying an access attempt to the specified memory region, with the access attempt received from the non-secure processing environment; and controlling the access attempt to the specified memory region, based on a policy.

In some aspects, this method further includes receiving a subsequent request with the memory locking service to release the lock on the specified memory region, and associating the specified memory region with the non-secure processing environment.

In some aspects, this method further includes scenarios where the request is received with the memory locking service via an application programming interface, and where the application programming interface is configured to receive at least one command to lock or unlock at least one memory region. For instance, the application programming interface may be accessible by an application of an operating system of the computing device, and where the request is used to secure access to data at the specified memory region that is associated with the application.

In some aspects, the method includes the policy defining a list of permitted accesses, and controlling the access attempt by granting access to the specified memory region if the access attempt satisfies the policy, and denying access to the specified memory region if the access attempt does not satisfy the policy. Also in some aspects, the method further includes logging the access attempt to the specified memory region.

In some aspects, the access to memory regions for the non-secure processing environment and the secure processing environment is controlled by a Security Attribution Unit and an Implementation Defined Attribution Unit, and the memory locking service is implemented as an isolated partition in the secure processing environment.

In some aspects, the techniques described herein relate to a non-transitory machine-readable storage medium including instructions, which when executed by processing circuitry of a computing device, causes the processing circuitry to perform operations of the aforementioned method or related processing actions.

In some aspects, the techniques described herein relate to a computing system, including: memory; a processor configured to provide a non-secure processing environment and a secure processing environment, the secure processing environment to provide a memory locking service; circuitry configured to implement at least one memory protection unit, the at least one memory protection unit to control access to regions of the memory that are associated with the non-secure processing environment or the secure processing environment; and circuitry configured to provide a security attribution unit adapted to: receive a request from the memory locking service to lock a specified memory region of the memory, with the specified memory region being associated with the non-secure processing environment; and associate the specified memory region with the secure processing environment; with the processor being further adapted to identify an access attempt to the specified memory region that is received from the non-secure processing environment, and control the access attempt to the specified memory region, based on a policy.

In some aspects, the techniques described herein relate to adaptations of this computing system, further configured to perform operations of the aforementioned method or related processing actions.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized the challenges of existing approaches for managing and configuring a computing environment using trusted execution environments (TEEs) as described above. The following describes functionality provided in a divided secure/non-secure processing environment to identify and control memory accesses associated with a secure TEE. In an example, this functionality is enabled by a service that causes selective locking of non-secure memory locations, so that specific non-secure memory regions can be upgraded, on-demand, to a secure state. Additionally, this service can be accompanied by functionality that causes access to the upgraded secure memory regions to be trapped and handled.

The following describes an implementation that is applicable to Trusted Firmware-M (TF-M), which provides a secure processing environment for execution on ARM® processor architectures (e.g., the Cortex-M33, Cortex-M23, Cortex-M55, Cortex-M85 processors, which include TrustZone-M security extensions). However, applicability to other environments, architectures, and products will be apparent. TF-M is an open source standard managed by the Trusted Firmware organization that provides an implementation of the TrustZone-M System-on-a-Chip (SoC) security extensions. TF-M can be extended with the following approaches to provide an integrated service that controls the selective locking of non-secure memory through a simple API.

In particular, the following discusses adaptation and use of hardware modules including the Security Attribution Unit (SAU) provided by TrustZone-M processors (e.g., TrustZone on Armv8-M architectures). A memory locking service can be provided within a TF-M environment to interface with the SAU to upgrade locations or regions of non-secure memory—during runtime—into secure regions of memory. Additionally, the following discusses how access to the upgraded secure memory regions can be trapped and handled within the TF-M environment so that secure domain software developers can monitor such accesses and perform access policy enforcement in response to the accesses.

This functionality can be added within TF-M or another TEE implementation to expose a security primitive that provides insight and control to memory accesses, especially in a non-secure domain that uses shared memory. This functionality can be implemented without additional hardware modules and/or new or proprietary processor extensions. Additionally, this functionality can be easily distributed and implemented with a minimal change to the TEE environment, such as by a small downstream fork of TF-M.

Figure 1:
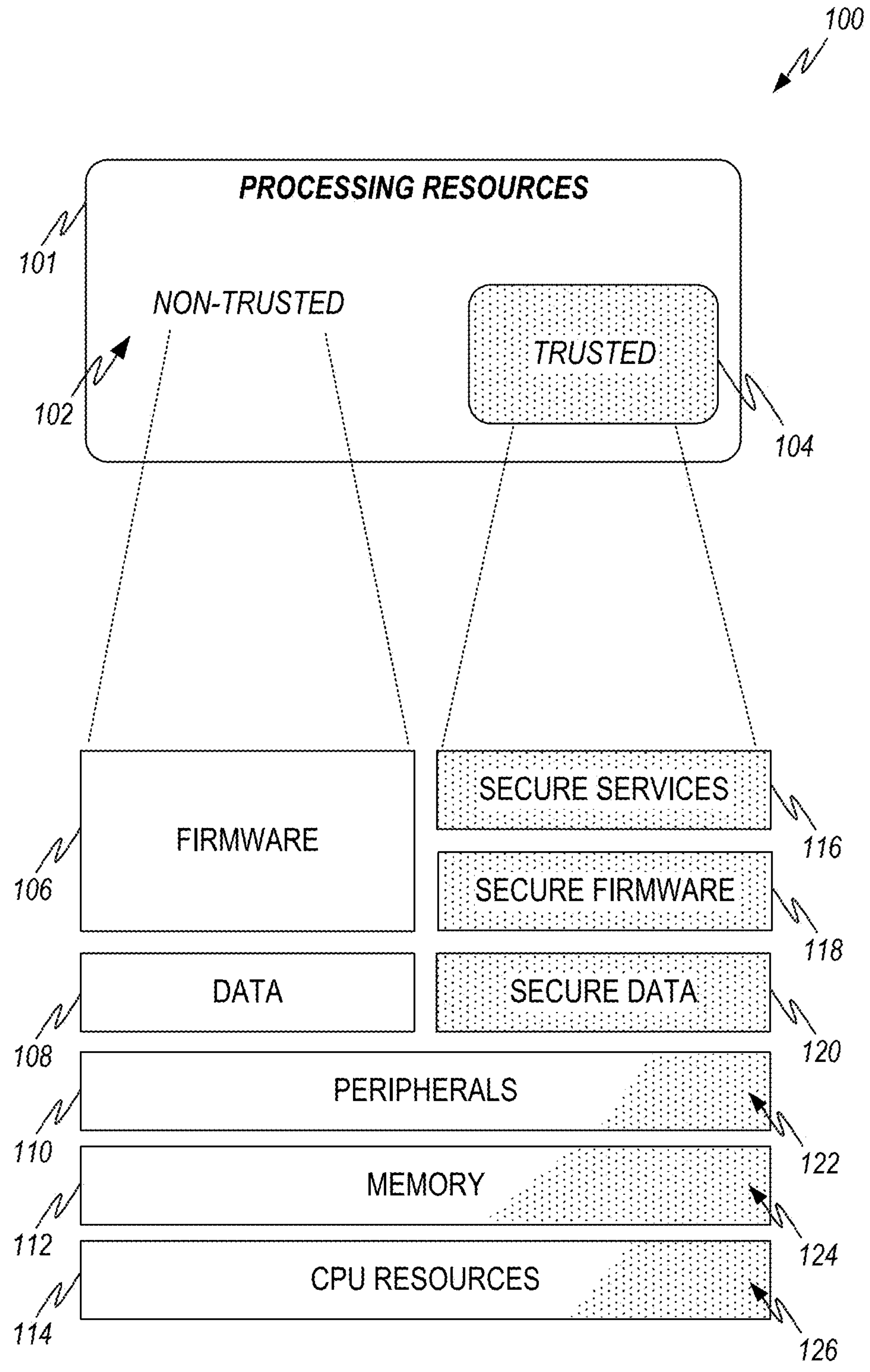
FIG. 1 is a simplified block diagram depicting a security architecture of a computing device, according to an example.

FIG. 1 is a simplified block diagram depicting an example security architecture of a computing device 100 that can implement various aspects of this disclosure. The computing device 100 is depicted as providing processing resources 101 composed from logical layers including firmware, data, peripherals, memory, and CPU resources (with other logical layers not depicted for simplicity). Although not directly depicted, the processing resources 101 of the computing device 100 may be used to provide a real-time operating system (RTOS) and a number of applications within the RTOS. As used herein, an RTOS generally refers to an operating system that provides some aspect of real-time computing applications, such as for processing data and events that have some time constraint or requirement. Non-limiting examples of a computing device that provide an RTOS include a mobile computer, an Internet of Things (IoT) device, an autonomous or semi-autonomous robot, an industrial control system, a medical device, and the like.

FIG. 1 depicts, at a high level, a separation between secure and non-secure areas of the logical layers. The processing resources as arranged in a TrustZone-M core (e.g., as provided by ARM processors v8 and thereafter) may exist in one of two domains: a non-trusted domain 102 that provides a non-secure processing environment (NPSE) (shown without shading), or a trusted domain 104 that provides a secure processing environment (SPE) (shown with shading). As a result, system hardware and software resources are generally partitioned to be divided between the trusted (secure) and non-trusted (non-secure) domains.

The non-trusted domain 102 is associated with (and uses) instructions and data in firmware 106 and application data 108. The non-trusted domain 102 also has access to non-secure areas of peripherals 110; memory 112; and CPU resources 114. The trusted domain 104, in contrast, is associated with (and uses) instructions and data in secure services 116, secure firmware 118, and secure data 120. The trusted domain 104 has access to a secure area of peripherals 122, a secure area of system memory 124, and a secure area of CPU resources 126, in addition to the non-secure areas of peripherals 110; memory 112; and CPU resources 114. In other words, the non-trusted domain 102 is restricted and can only access non-secure resources, whereas the trusted domain 104 is unrestricted and can access all resources including the entire memory space of memory 112.

As discussed in more detail in FIG. 2, below, each processing domain uses the SAU, an Implementation Defined Attribution Unit (IDAU), and a respective memory protection unit (MPU) to enforce memory isolation and confidentiality. The respective MPU enforces the strict memory division provided by the operating mode, including in system memory 124 and in some examples for data in buses and peripherals as enforced by respective controllers.

Many applications of the computing device 100 may be implemented in the non-trusted domain 102, such as the application logic and multi-threading support provided by an RTOS (as applicable). However, any piece of code or data that exists within the non-trusted domain 102—including privileged code such as the RTOS and any interrupt handler—is vulnerable to modification from other entities operating in the non-trusted domain 102. Thus, even with trusted/non-trusted domain protection, an MPU cannot be exclusively relied upon to control memory access for important system functions, because in an NSPE the memory accesses are designed to be modifiable and controllable by any non-secure privileged code.

With the following approach, secure domain memory protection is extended to protect and identify inappropriate memory accesses in a non-trusted domain of the NPSE. This memory protection approach can be implemented in a processing environment such as TF-M without additional hardware changes—although specialized hardware changes to a processor architecture can be additionally or alternatively used to implement aspects of the present techniques.

In an example, the memory protection techniques are implemented using software provided in an executable partition in the SPE. TF-M provides the concept of "partitions", which are self-contained payloads that can be enabled or disabled (e.g., through a single compile-time option as part of the TF-M configuration before the binary is built). These partitions have different levels of privilege, the lowest being the application service partitions. An advantage of such a design is that partitions can be built out-of-tree, enabling partition developers to simply link their partition into upstream TF-M code. Accordingly, implementing the memory protection approach as an executable partition (or similar payload) can help provide portability and distributability for a variety of SPE implementations.

In a TF-M configuration, partitions can be used to host a service that exposes one or more APIs to other TF-M partitions and non-secure code. For example, a memory locking service can expose lock and unlock request APIs (or, a single API) to the non-secure domain. This API can be configured to receive a memory address region or regions as an API argument. Additionally, in a TF-M configuration, a partition is used to provide an Access Policy Management Engine that manages and enforces access control policies for secure services. The configuration of this engine and partitions can be defined (e.g., at compile time by the partition developer) to evaluate and determine whether a memory lock or unlock request is valid or invalid.

Figure 2:
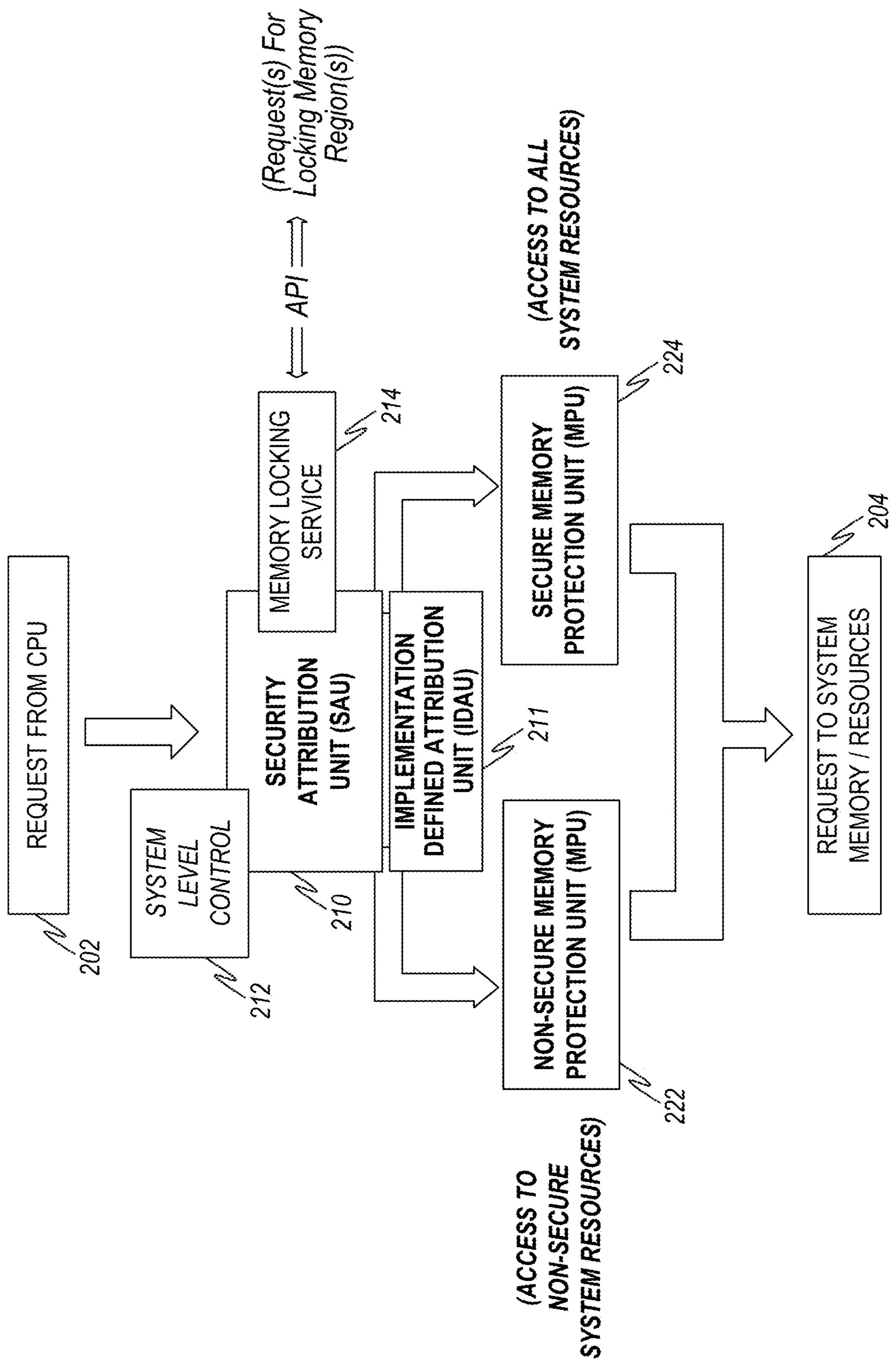
FIG. 2 is a flow diagram depicting request processing in a Trusted Firmware-M (TF-M) implementation, according to an example.

FIG. 2 is a flow diagram depicting an example of request processing in a TF-M implementation. This flow diagram shows how a security attribution unit, SAU 210, is adapted to handle memory requests such as a memory request 202 from software executing in a CPU. The SAU 210 is provided as part of the TrustZone-M core specification, and allows a system designer to fine-tune memory segmentation between the secure and non-secure domains.

The SAU 210 uses system-level control 212 to segment and control the SPE and the NPSE and associated resources as depicted in FIG. 1. Additionally, the SAU 210 is extended to implement a memory locking service 214, for locking specific memory locations used by the NPSE. In TrustZone-M systems, an IDAU 211 (Implementation Defined Attribution Unit) provides a fixed division of memory between trusted and non-trusted memory—which the hardware vendor decides when designing the SoC—while the SAU 210 provides a degree of flexibility to modify that division by providing a set of MPU-like registers that can be modified by SPE software. MPUs, such as non-secure MPU 222 and secure MPU 224, on the other hand, evaluate software "privilege" to decide whether a particular resource is accessible or not. To ensure that previous generation software designs remain compatible, these MPUs are provided within each domain to allow for software in the respective domain to maintain privileges as before. Accordingly, the SAU 210 and IDAU 211 combination decides if a resource is accessible based on the security domain (trusted/non-trusted), and forwards the access request to the relevant domain's MPU. The respective MPU then checks the privilege state of the processor to determine if the resource is accessible under the current privilege state.

Thus, in operation, the SAU 210 and IDAU 211 are configured to handle valid secure requests with a secure memory protection unit (secure MPU 224, which has access to all system resources) and to handle non-secure requests with a non-secure memory protection unit (non-secure MPU 222, which has access to only non-secure system resources). If a request is valid, the non-secure MPU 222 or secure MPU 224 respectively will forward the memory request to access system memory/resources 204.

The memory locking is implemented by repurposing the SAU 210 to respond to API requests provided to a memory locking service 214. In example TrustZone-M implementations, the 32-bit addressable memory region is segmented into secure and non-secure regions based on the 28th bit of the memory address. Processing of the memory address can be performed by the IDAU 211, since the IDAU 211 operates as a hardware unit placed on the bus that arbitrates access to resources. (This behavior may be adapted by an SoC designer by modification of the IDAU 211). As an example, if the bit of the memory address is set, then this memory address is only accessible by the secure domain via the IDAU 211. If in the secure mode, the secure memory location can be accessed; if not in the secure mode, the attempted access will cause a fault. This use of bit [28] establishes a fixed division in the memory map. Although this division is sufficient for a majority of applications, the SAU 210 provides an ability to selectively upgrade other regions or addresses of the non-secure memory of the NPSE into a secure state—similar to what would occur if these memory regions or addresses were designated as part of the SPE by the IDAU 211.

To enable the memory locking with the memory locking service 214, the locking partition checks (e.g., during system bootup) if the SAU 210 can be re-programmed without breaking other TF-M services. The SAU 210 has a limited number of memory regions that it can concurrently upgrade into a secure state—in some implementations this is a maximum of eight memory regions, but this number may be increased in some settings. If other system services have upgraded all eight memory regions into a secure state, then the locking partition cannot operate fully and the memory locking service 214 can simply ignore all additional locking requests that arrive via the API. Otherwise, if additional memory regions are available to be upgraded, the memory locking service 214 will attempt to use a first available region of the SAU 210 to service the memory locking request(s).

Once a memory region is locked (e.g., a memory region is upgraded by the SAU 210 to the secure domain), then this memory region cannot be directly accessed by the non-secure domain. If the non-secure domain accesses that memory region, a fault will occur and the Secure Fault Handler will immediately launch. In some settings, the Secure Fault Handler may be configured to reset the processor in response to the fault. However, a special subroutine may be used to determine whether the fault arose due to accessing a locked region, to then handle the fault with the partition's access management policy (managed by an access management policy engine). If no fault processing routine is provided, the Secure Fault Handler may reset the processor.

An access management policy engine can be extended to perform various tasks in response to the attempted memory access, based on a configuration and access policy or policies. If access is permitted, the engine may allow the access to take place by unlocking the region (and optionally, setting a timer to re-lock the region) and returning the code execution back to the non-secure domain. The access management policy engine can also log which instruction accessed the region and calculate the frequency of accesses, as the Secure Fault Handler provides this information.

Logging data from such faults may be useful for auditing and investigation purposes. The logged data, for example, may be fed to a machine learning or other AI model that has been trained to classify whether the particular type of access is valid or invalid. In other scenarios, the Secure Fault Handler can simply reset the processor and raise an alarm if the particular type of access is valid or invalid. Accordingly, the lock mechanism provided by the memory locking service 214 is essentially a trapping scheme since it traps accesses to locked memory locations using the SAU 210.

The use of this memory-locking approach can obtain a significant amount of information from the Secure Fault Handler that can be used for improving or optimizing access policy management. Further data analysis may provide a source of information for machine learning models to be trained and implemented. However, as discussed above, the use of partitions and adaptation of the SAU 210 does not necessarily require hardware changes or additional hardware, and allows deployment in a variety of existing SPE/NPSE implementations.

Moreover, this memory-locking approach can be used for a variety of use cases. This may include security-sensitive operations such as a firmware update initiated from a non-secure domain, which is tied to secure boot functions but needs to be isolated from regular RTOS processes. Another use case may include the tracking and storing of cryptography variables, data structures that include keys, sensitive application data, and the like. Thus, the present approaches allow a temporary upgrade to common aspects of data used in a NSPE, while ensuring that such data can be securely maintained and not leaked to or tampered with by unauthorized entities.

Figure 3:
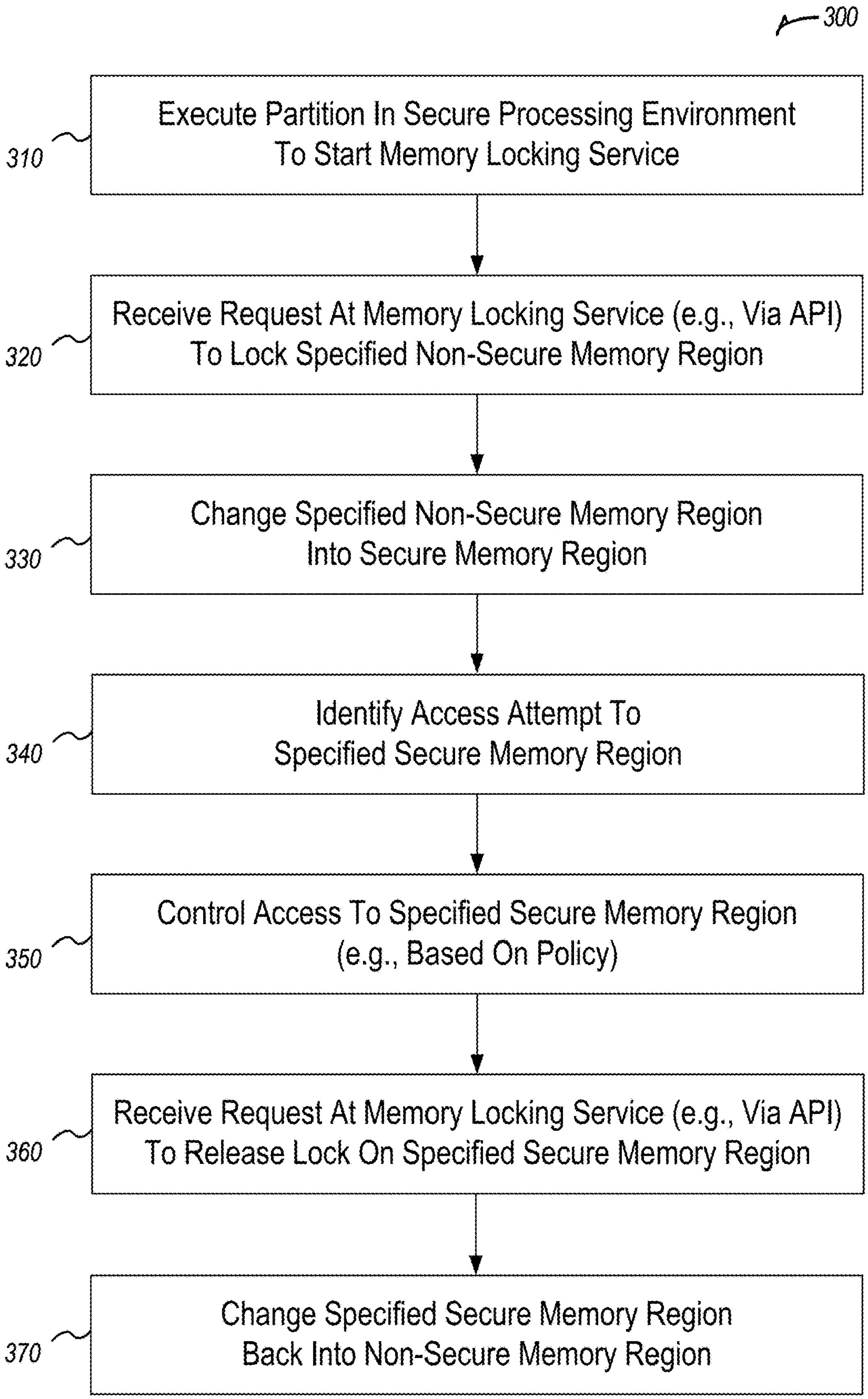
FIG. 3 is a flowchart depicting a method for implementing secure memory locking in a non-secure processing environment, according to an example.

FIG. 3 is a flowchart of an example method of implementing secure memory locking in a non-secure processing environment. This method may be implemented by a combination or coordination of a specially configured memory locking service, Security Attribution Unit, Implementation Defined Attribution Unit, Access Policy Management Engine, Memory Protection Unit, Secure Fault Handler, and other entities discussed above. These and other services, engines, and modules are configured to provide a SPE and NSPE as discussed above. However, other extensions and implementations—including with specialized processor instructions or extensions—will be apparent.

At 310, an operation is performed (e.g., with a processor that provides a non-secure processing environment and a secure processing environment) to execute a partition in a secure processing environment of the computing device/system. In some examples, this memory locking service is implemented as an isolated partition in the secure processing environment. This partition starts or configures a memory locking service, such as memory locking service 214 discussed above.

At 320, an operation is performed (e.g., with circuitry configured to provide a security attribution unit, such as SAU 210 discussed above) to receive and process a request with the memory locking service to lock a specified memory region of the computing device. This specified memory region, before being upgraded to a locked state, is associated with the non-secure processing environment. In an example, this request may be received with the memory locking service via an API, such as an API that is configured to receive at least one command with specific parameters or specifications to lock or unlock at least one memory region, address, address range, etc. In other examples, an API may be configured to receive a thread identifier (thread ID), and temporarily lock/secure all non-secure memory areas that are not associated with the specified thread. In this way, the API may be configured to perform memory locking on an inclusion basis (e.g., only to lock a specified location or area of memory) or on an exclusion basis (e.g., to lock all but the specified location or area of memory).

At 330, an operation is performed (e.g., with circuitry configured to provide the security attribution unit, such as SAU 210 discussed above) to associate the specified memory region with the secure processing environment. In some examples, the access to memory regions for the non-secure processing environment and the secure processing environment is controlled by a Security Attribution Unit (SAU) and an Implementation Defined Attribution Unit (IDAU) such as is provided in a TrustZone-M processor architecture. These secure versus non-secure environments may be configured as discussed with reference to FIGS. 1 and 2, above.

At 340, an operation is performed (e.g., with the processor or other circuitry) to identify an access attempt to the specified secure memory region, such as an access attempt that is received from the non-secure processing environment. In some examples, this may include logging the access attempt to the specified memory region.

At 350, an operation is performed (e.g., with the processor or other circuitry) to control access to the specified secure memory region, based on a policy, configuration, or other deterministic criterion. In an example where a policy is used, controlling the access attempt includes granting access to the specified memory region if the access attempt satisfies the policy, and denying access to the specified memory region if the access attempt does not satisfy the policy.

At 360, an operation is performed (e.g., with circuitry with configured to provide the security attribution unit, such as SAU 210 discussed above) to receive and process a request with the memory locking service to unlock (e.g., release the lock or "unsecure") the specified memory region of the computing device. This operation may include receiving and processing a subsequent request, via the API, to release the lock on the specified memory region.

At 370, an operation is performed (e.g., with circuitry with configured to provide the security attribution unit, such as SAU 210 discussed above) to change the specified secure memory region back into a non-secure memory region. This operation may include associating the specified memory region with the non-secure processing environment.

Figure 4:
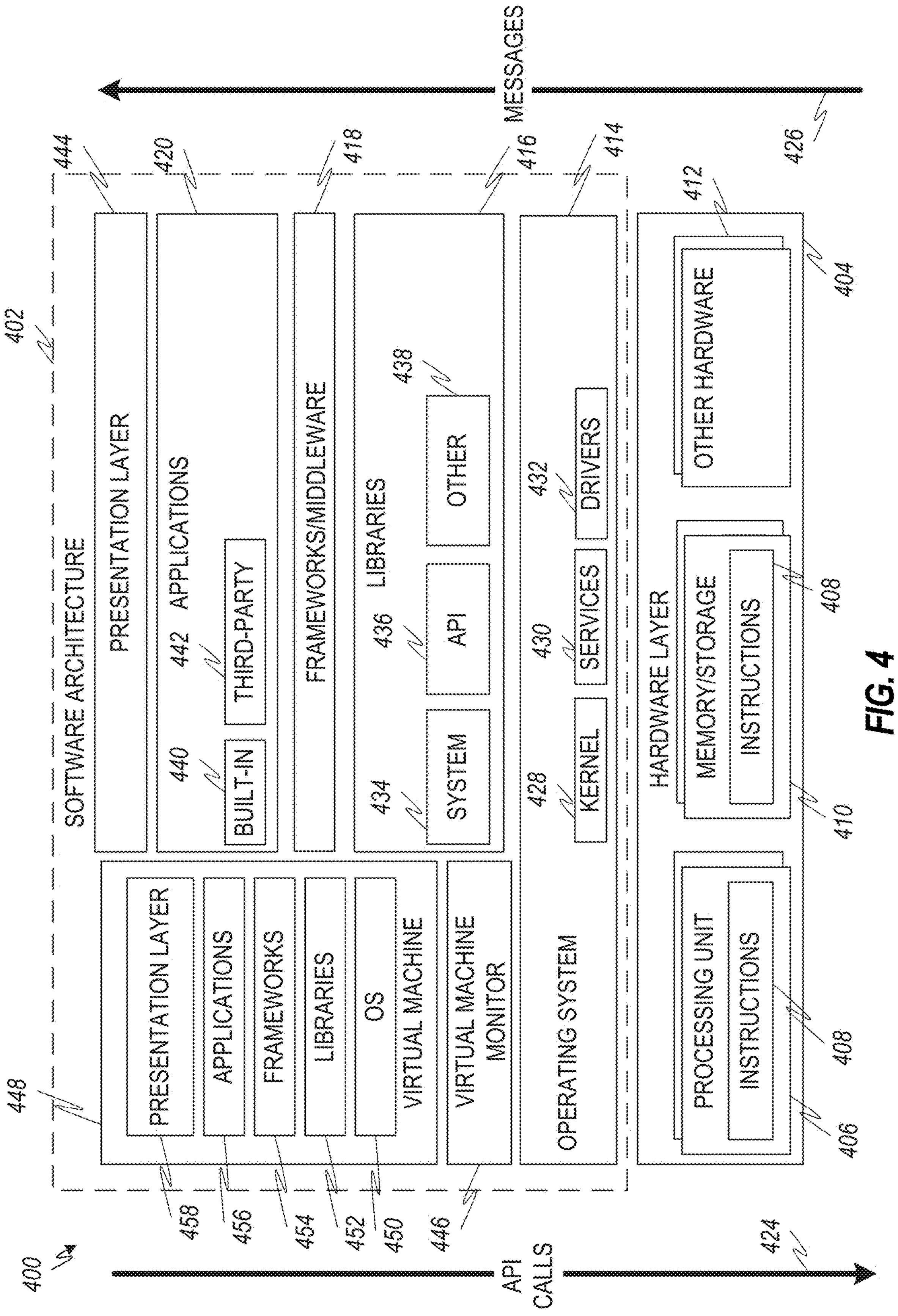
FIG. 4 is a block diagram showing an architecture for a computing device, according to an example.

FIG. 4 is a block diagram showing an example of an architecture 400 for a computing device. The architecture 400 may be used in conjunction with various hardware configurations as described above (including with reference to FIGS. 1 and 2). FIG. 4 is merely a non-limiting example of a computing device supporting a software architecture 402, but it will be understood that many other architecture arrangements may be implemented to facilitate the functionality described herein. A representative example of a hardware layer 404 is also illustrated and can represent, for example, any of the above referenced computing devices or hardware components. In some examples, the hardware layer 404 may be implemented according to the architecture of the computer system of FIG. 5.

The hardware layer 404 comprises one or more processing units 406 having executable instructions 408. Executable instructions 408 represent the executable instructions of the software architecture 402, including implementation of the methods, modules, subsystems, and components, and so forth described herein and may also include memory and/or storage components 410, which also have executable instructions 408. Hardware layer 404 may also comprise other hardware as indicated by other hardware 412 which represents any other hardware of the hardware layer 404, such as the other hardware illustrated as part of the software architecture 402.

In the example architecture of FIG. 4, the software architecture 402 may be conceptualized as a stack of layers where each layer provides particular functionality. For example, the software architecture 402 may include layers such as an operating system 414, libraries 416, frameworks/middleware 418, applications 420, and presentation layer 444. Operationally, the applications 420 and/or other components within the layers may invoke messaging (e.g., with application programming interface (API) messages such as API calls 424) through the software stack and access a response, returned values, and so forth (e.g., illustrated as messages 426 in response to the API calls 424). The layers illustrated are representative in nature and not all software architectures have all layers. For example, some mobile or special purpose operating systems may not provide a frameworks/middleware 418, while others may provide such a layer. Other software architectures may include additional or different layers.

The operating system 414 may manage hardware resources and provide common services. The operating system 414 may include, for example, a kernel 428, services 430, and drivers 432. The kernel 428 may act as an abstraction layer between the hardware and the other software layers. For example, the kernel 428 may be responsible for memory management, processor management (e.g., scheduling), component management, networking, security settings, and so on. The services 430 may provide other common services for the other software layers. In some examples, the services 430 include an interrupt service. The interrupt service may detect the receipt of an interrupt and, in response, cause the software architecture 402 to pause its current processing and execute an interrupt service routine (ISR) when an interrupt is accessed.

The drivers 432 may be responsible for controlling or interfacing with the underlying hardware. For instance, the drivers 432 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 416 may provide a common infrastructure that may be utilized by the applications 420 and/or other components and/or layers. The libraries 416 typically provide functionality that allows other software components/modules to perform tasks in an easier fashion than to interface directly with the operating system 414 functionality (e.g., kernel 428, services 430 and/or drivers 432). The libraries 416 may include system libraries 434 (e.g., C standard library) that may provide functions such as memory allocation functions, string manipulation functions, mathematic functions, and the like. In addition, the libraries 416 may include API libraries 436 such as media libraries (e.g., libraries to support presentation and manipulation of various media formats), graphics libraries (e.g., libraries to render two-dimensional and three-dimensional in a graphic content on a display), database libraries (e.g., libraries that provide various relational database functions), web libraries (e.g., libraries that provide web browsing functionality), and the like. The libraries 416 may also include a wide variety of other libraries 438 to provide many other APIs to the applications 420 and other software components/modules.

The frameworks/middleware 418 may provide a higher-level common infrastructure that may be utilized by the applications 420 and/or other software components/modules. For example, the frameworks/middleware 418 may provide various graphic user interface (GUI) functions, high-level resource management, high-level location services, and so forth. The frameworks/middleware 418 may provide a broad spectrum of other APIs that may be utilized by the applications 420 and/or other software components/modules, some of which may be specific to a particular operating system or platform.

The applications 420 may include built-in applications 440 and/or third-party applications 442. Representative examples of the built-in applications 440 on a mobile device may include, but are not limited to, a contacts application, a browser application, a book reader application, a location application, a media application, a messaging application, and/or a game application. Third-party applications 442 may include any of the built-in applications as well as a broad assortment of other applications. In a specific example, the third-party application 442 (e.g., an application developed using the Android™ or iOS™ software development kit (SDK) by an entity other than the vendor of the particular platform) may be mobile software running on a mobile operating system such as iOS™, Android™, or other mobile computing device operating systems. In this example, the third-party application 442 may invoke the API calls 424 provided by the mobile operating system such as operating system 414 to facilitate functionality described herein.

The applications 420 may utilize built in operating system functions (e.g., kernel 428, services 430 and/or drivers 432), libraries (e.g., system libraries 434, API libraries 436, and other libraries 438), frameworks/middleware 418 to create user interfaces to interact with users of the system. Alternatively, or additionally, in some systems, interactions with a user may occur through a presentation layer, such as presentation layer 444. In these systems, the application/module "logic" can be separated from the aspects of the application/module that interact with a user.

Some software architectures utilize virtual machines. In the example of FIG. 4, this is illustrated by virtual machine 448. A virtual machine creates a software environment where applications/modules can execute as if they were executing on a hardware computing device. A virtual machine can be hosted by a host operating system (operating system 414) and may include a virtual machine monitor 446 that manages the operation of the virtual machine as well as the interface with the host operating system (i.e., operating system 414). A software architecture executes within the virtual machine 448 such as an operating system 450, libraries 452, frameworks/middleware 454, applications 456 and/or presentation layer 458. These layers of software architecture executing within the virtual machine 448 can be the same as corresponding layers previously described or may be different.

Certain embodiments are described herein as including logic or a number of components, modules, or mechanisms. Components may constitute either software components (e.g., code embodied on a non-transitory machine-readable medium or in a transmission signal) or hardware-implemented components. A hardware-implemented component is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented component that operates to perform certain operations as described herein.

In various embodiments, a hardware-implemented component may be implemented mechanically or electronically. For example, a hardware-implemented component may comprise dedicated circuitry or logic that is permanently configured (e.g., as a special-purpose processor, such as a field programmable gate array (FPGA) or an application-specific integrated circuit (ASIC)) to perform certain operations. A hardware-implemented component may also comprise programmable logic or circuitry (e.g., as encompassed within a general-purpose processor or another programmable processor) that is temporarily configured by software to perform certain operations. It will be appreciated that the decision to implement a hardware-implemented component mechanically, in dedicated and permanently configured circuitry, or in temporarily configured circuitry (e.g., configured by software) may be driven by technical, cost, or time considerations.

Accordingly, any of the hardware components or modules described herein should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented components are temporarily configured (e.g., programmed), each of the hardware-implemented components need not be configured or instantiated at any one instance in time. For example, where the hardware-implemented components comprise a general-purpose processor configured using software, the general-purpose processor may be configured as respective different hardware-implemented components at different times. Software may accordingly configure a processor, for example, to constitute a particular hardware-implemented component at one instance of time and to constitute a different hardware-implemented component at a different instance of time.

Hardware-implemented components can provide information to, and receive information from, other hardware-implemented components. Accordingly, the described hardware-implemented components may be regarded as being communicatively coupled. Where multiple of such hardware-implemented components exist contemporaneously, communications may be achieved through signal transmission (e.g., over appropriate circuits and buses that connect the hardware-implemented components). In embodiments in which multiple hardware-implemented components are configured or instantiated at different times, communications between such hardware-implemented components may be achieved, for example, through the storage and retrieval of information in memory structures to which the multiple hardware-implemented components have access. For example, one hardware-implemented component may perform an operation, and store the output of that operation in a memory device to which it is communicatively coupled. A further hardware-implemented component may then, at a later time, access the memory device to retrieve and process the stored output. Hardware-implemented components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented devices, systems, or machines that operate to perform one or more operations or functions. Similarly, the methods described herein may be at least partially processor-implemented. For example, at least some of the operations of a method may be performed by one or more processors or processor-implemented devices, systems, or machines. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a software module, subroutine, or other unit suitable for use in a computing environment. A computer program can be deployed to be executed on one computer or on multiple computers at one site or distributed across multiple sites and interconnected by a communication network.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Figure 5:
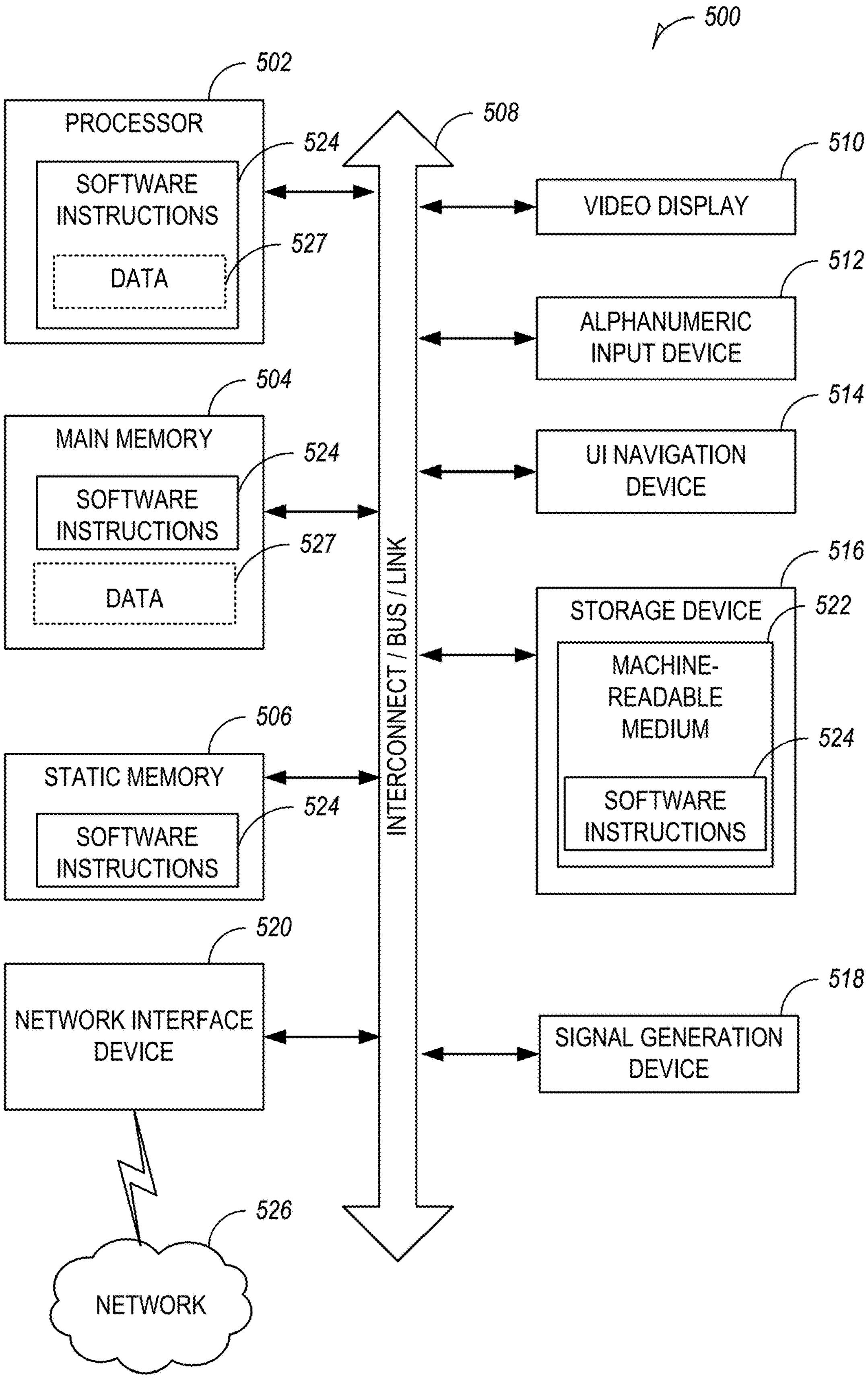
FIG. 5 is a block diagram of a machine in the example form of a computer system within which instructions may be executed for causing the machine to perform any one or more of the methodologies discussed herein.

FIG. 5 is a block diagram of a machine in the example form of a computer system 500 within which instructions 524 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU), or both), a main memory 504, and a static memory 506, which communicate with each other via an interconnect, bus, or link 508. The computer system 500 may further include a video display unit 510 (e.g., a liquid crystal display (LCD) or a cathode ray tube (CRT)). The computer system 500 may also include an alphanumeric input device 512 (e.g., a keyboard or a touch-sensitive display screen), a user interface (UI) navigation (or cursor control) device 514 (e.g., a mouse), a storage device 516, a signal generation device 518 (e.g., a speaker), and a network interface device 520.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504 and/or within the processor 502 during execution thereof by the computer system 500, with the main memory 504 and the processor 502 also constituting a machine-readable medium 522.

While the machine-readable medium 522 is shown in an example embodiment to be a single medium, the term "machine-readable medium" may include a single medium or multiple media (e.g., a centralized or distributed database, and/or associated caches and servers) that store the instructions 524 or data structures. The term "machine-readable medium" shall also be taken to include any tangible, non-transitory medium that is capable of storing, encoding, or carrying the instructions 524 for execution by the machine and that cause the machine to perform any one or more of the methodologies of the present disclosure, or that is capable of storing, encoding, or carrying data structures utilized by or associated with the instructions 524. The term "machine-readable medium" shall accordingly be taken to include, but not be limited to, solid-state memories, and optical and magnetic media. Specific examples of a machine-readable medium 522 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium as used herein is not a transmission medium.

VARIOUS NOTES

Each of the non-limiting examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described.

However, the present inventors also contemplate examples in which only those elements shown or described are provided. Moreover, the present inventors also contemplate examples using any combination or permutation of those elements shown or described (or one or more claims thereof), either with respect to a particular example (or one or more claims thereof), or with respect to other examples (or one or more claims thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more claims thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A method of controlling memory access in a non-secure processing environment, the method comprising:

providing a memory locking service in a computing device, the computing device including a secure processing environment and a non-secure processing environment, wherein the memory locking service is executed in the secure processing environment, wherein the computing device divides hardware and software resources into the secure processing environment and the non-secure processing environment to provide concurrently operating separate execution domains, and wherein the secure processing environment and the non-secure processing environment are associated with separate hardware-enforced memory regions;

receiving a request with the memory locking service to lock a specified memory region of the computing device, the specified memory region being associated with the non-secure processing environment;

associating the specified memory region with the secure processing environment;

identifying an access attempt to the specified memory region, the access attempt received from the non-secure processing environment, wherein the access attempt from the non-secure processing environment causes a fault; and controlling the access attempt to the specified memory region, based on a policy, wherein controlling the access attempt includes invoking a fault handler in the secure processing environment to handle the fault and determining whether to permit or deny the access attempt based on the policy.

2. The method of claim 1, further comprising:

receiving a subsequent request with the memory locking service to release the lock on the specified memory region; and associating the specified memory region with the non-secure processing environment.

3. The method of claim 1, wherein the request is received with the memory locking service via an application programming interface, and wherein the application programming interface is configured to receive at least one command to lock or unlock at least one memory region.

4. The method of claim 3, wherein the application programming interface is accessible by an application of an operating system of the computing device, and wherein the request is used to secure access to data at the specified memory region that is associated with the application.

5. The method of claim 1, wherein access to memory regions for the non-secure processing environment and the secure processing environment is controlled by hardware elements including a Security Attribution Unit and an Implementation Defined Attribution Unit.

6. The method of claim 1, wherein the memory locking service is implemented as an isolated partition in the secure processing environment.

7. The method of claim 1, wherein the policy defines a list of permitted accesses, and wherein controlling the access attempt includes granting access to the specified memory region if the access attempt satisfies the policy, and denying access to the specified memory region if the access attempt does not satisfy the policy.

8. The method of claim 1, further comprising:

logging the access attempt to the specified memory region.

9. A non-transitory machine-readable storage medium comprising instructions, which when executed by processing circuitry of a computing device, causes the processing circuitry to perform operations that:

provide a memory locking service in the computing device, the computing device including a secure processing environment and a non-secure processing environment, wherein the memory locking service is executed in the secure processing environment, wherein the computing device divides hardware and software resources into the secure processing environment and the non-secure processing environment to provide concurrently operating separate execution domains, and wherein the secure processing environment and the non-secure processing environment are associated with separate hardware-enforced memory regions;

receive a request with the memory locking service to lock a specified memory region of the computing device, the specified memory region being associated with the non-secure processing environment;

associate the specified memory region with the secure processing environment;

identify an access attempt to the specified memory region, the access attempt received from the non-secure processing environment, wherein the access attempt from the non-secure processing environment causes a fault; and control the access attempt to the specified memory region, based on a policy, wherein the control of the access attempt includes operations that invoke a fault handler in the secure processing environment to handle the fault and determine whether to permit or deny the access attempt based on the policy.

10. The non-transitory machine-readable storage medium of claim 9, the instructions further to cause the processing circuitry to perform operations that:

receive a subsequent request with the memory locking service to release the lock on the specified memory region; and associate the specified memory region with the non-secure processing environment.

11. The non-transitory machine-readable storage medium of claim 9, wherein the request is received with the memory locking service via an application programming interface, and wherein the application programming interface is configured to receive at least one command to lock or unlock at least one memory region.

12. The non-transitory machine-readable storage medium of claim 11, wherein the application programming interface is accessible by an application of an operating system of the computing device, and wherein the request is used to secure access to data at the specified memory region that is associated with the application.

13. The non-transitory machine-readable storage medium of claim 9, wherein access to memory regions for the non-secure processing environment and the secure processing environment is controlled by hardware elements including a Security Attribution Unit and an Implementation Defined Attribution Unit.

14. The non-transitory machine-readable storage medium of claim 11, wherein the memory locking service is implemented as an isolated partition in the secure processing environment.

15. The non-transitory machine-readable storage medium of claim 11, wherein the policy defines a list of permitted accesses, and wherein to control the access attempt includes to grant access to the specified memory region if the access attempt satisfies the policy, and to deny access to the specified memory region if the access attempt does not satisfy the policy.

16. A computing system, comprising:

memory;

a processor configured to provide a non-secure processing environment and a secure processing environment, the secure processing environment to provide a memory locking service, wherein the computing system divides hardware and software resources into the secure processing environment and the non-secure processing environment to provide concurrently operating separate execution domains, and wherein the secure processing environment and the non-secure processing environment are associated with separate hardware-enforced regions of the memory;

circuitry configured to implement at least one memory protection unit, the at least one memory protection unit to control access to regions of the memory that are associated with the non-secure processing environment or the secure processing environment; and circuitry configured to provide a security attribution unit adapted to:

receive a request from the memory locking service to lock a specified memory region of the memory, wherein the specified memory region is associated with the non-secure processing environment; and associate the specified memory region with the secure processing environment;

wherein the processor is further adapted to:

identify an access attempt to the specified memory region that is received from the non-secure processing environment, wherein the access attempt from the non-secure processing environment causes a fault; and control the access attempt to the specified memory region, based on a policy, wherein the control of the access attempt includes operations that invoke a fault handler in the secure processing environment to handle the fault and determine whether to permit or deny the access attempt based on the policy.

17. The computing system of claim 16, wherein the circuitry configured to provide the security attribution unit is further adapted to receive a subsequent request from the memory locking service to release the lock on the specified memory region, and associate the specified memory region with the non-secure processing environment.

18. The computing system of claim 16, wherein the request is received with the memory locking service via an application programming interface, and wherein the application programming interface is configured to receive at least one command to lock or unlock at least one memory region.

19. The computing system of claim 18, wherein the application programming interface is accessible by an application of an operating system of the computing system, and wherein the request is used to secure access to data at the specified memory region that is associated with the application.

20. The computing system of claim 16, wherein the policy defines a list of permitted accesses, and wherein to control the access attempt includes to grant access to the specified memory region if the access attempt satisfies the policy, and to deny access to the specified memory region if the access attempt does not satisfy the policy.

* * * * *